No. 824,331. PATENTED JUNE 26, 1906.
J. P. BARNES.
CHAIN GRATE.
APPLICATION FILED NOV. 16, 1903.

3 SHEETS—SHEET 1.

Witnesses:
H. J. Slagle
E. O. Behel

Inventor:
Joseph P. Barnes
By A. O. Behel
atty.

No. 824,331. PATENTED JUNE 26, 1906.
J. P. BARNES.
CHAIN GRATE.
APPLICATION FILED NOV. 16, 1903.

3 SHEETS—SHEET 2.

Witnesses:
H. Slagle
E. Behel

Inventor:
Joseph P. Barnes
By A. O. Behel
Atty.

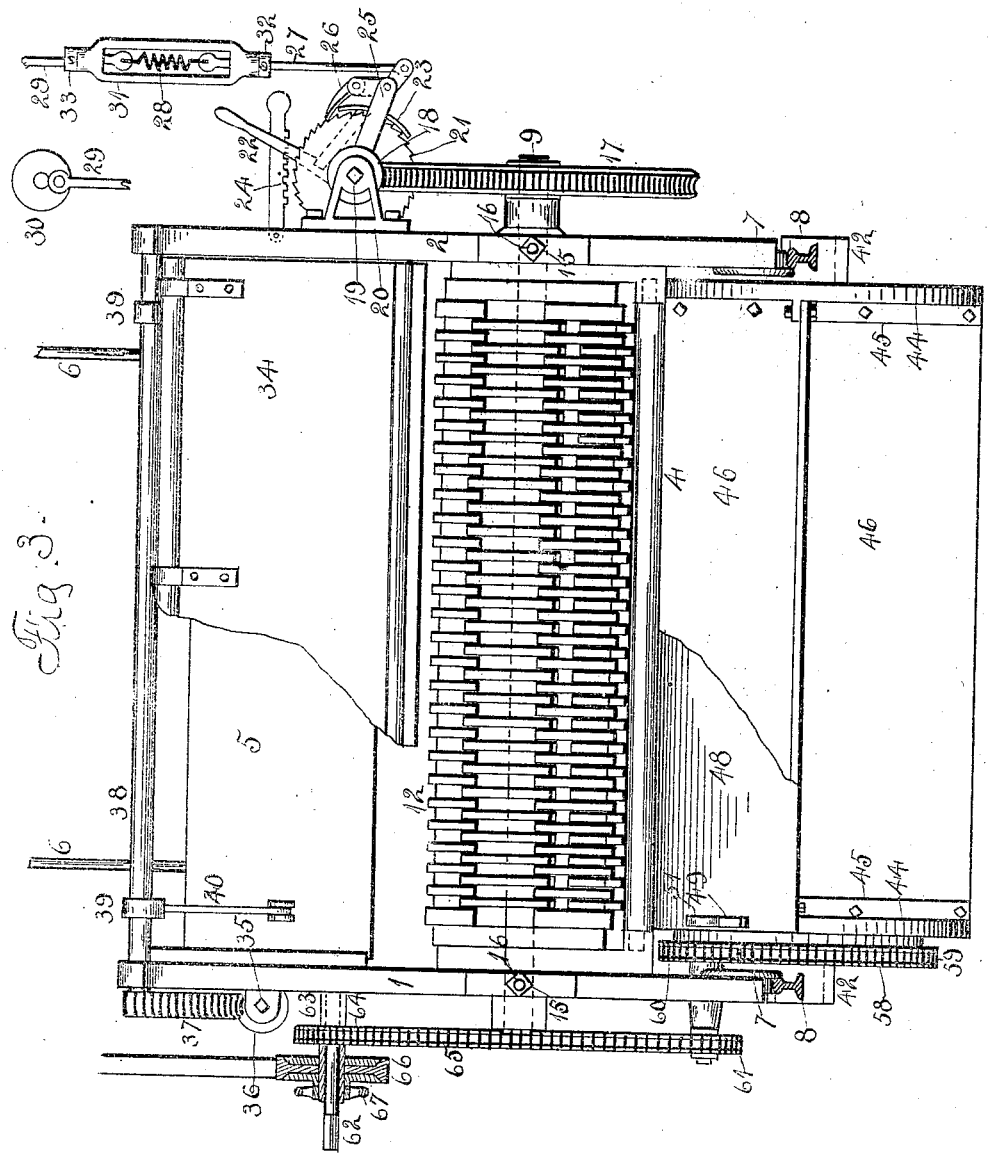

able bars or tubes

UNITED STATES PATENT OFFICE.

JOSEPH P. BARNES, OF ROCKFORD, ILLINOIS, ASSIGNOR TO W. F. & JOHN BARNES COMPANY, OF ROCKFORD, ILLINOIS, A CORPORATION OF ILLINOIS.

CHAIN GRATE.

No. 824,331.

Specification of Letters Patent.

Patented June 26, 1906.

Application filed November 16, 1903. Serial No. 181,454.

*To all whom it may concern:*

Be it known that I, JOSEPH P. BARNES, a citizen of the United States, residing at Rockford, in the county of Winnebago and State of Illinois, have invented certain new and useful Improvements in Chain Grates, of which the following is a specification.

The object of this invention is to provide means for transferring the ashes from the fire-chamber without admitting cold-air to the fire-chamber.

Figure 1:
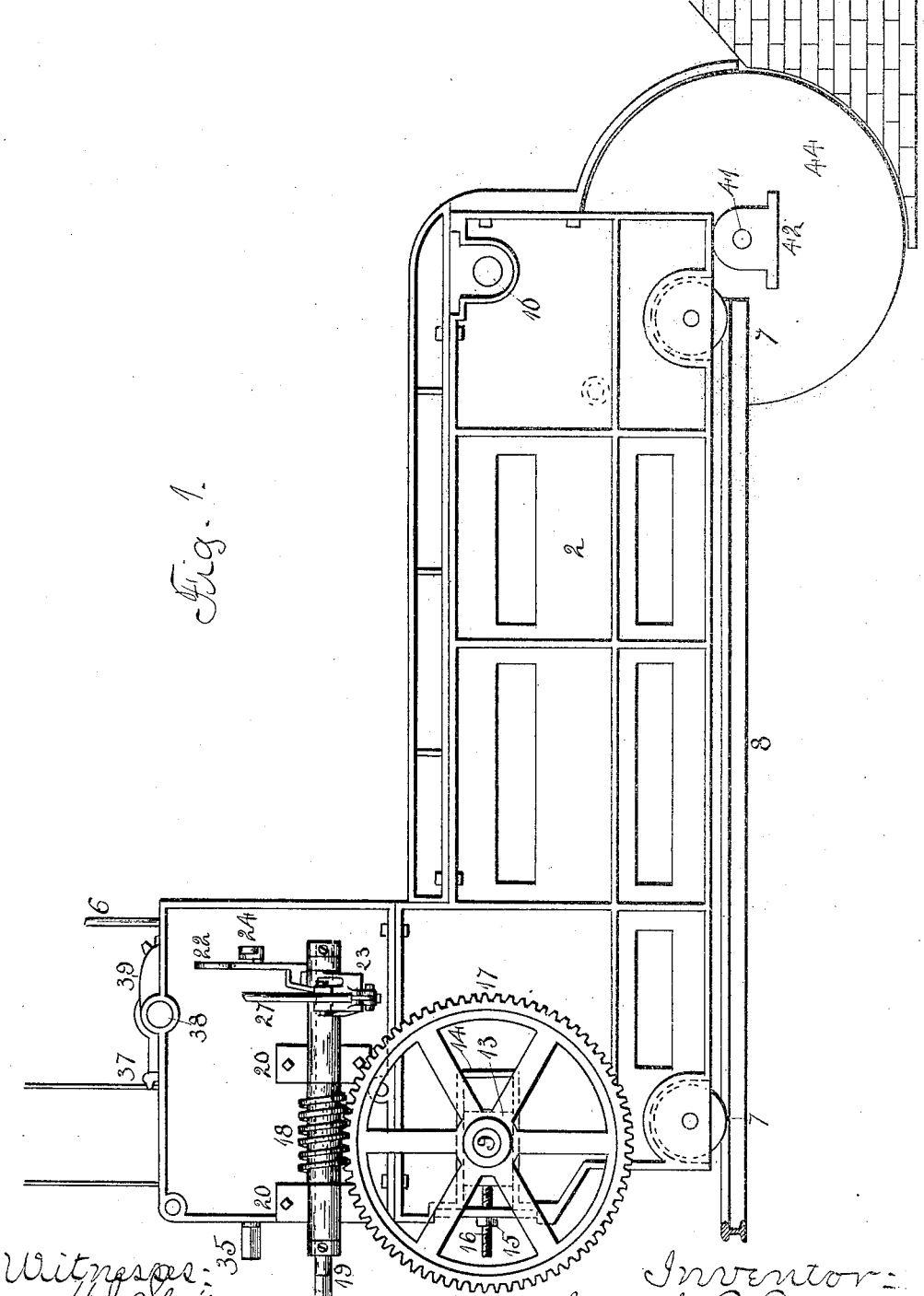
Figure 2:
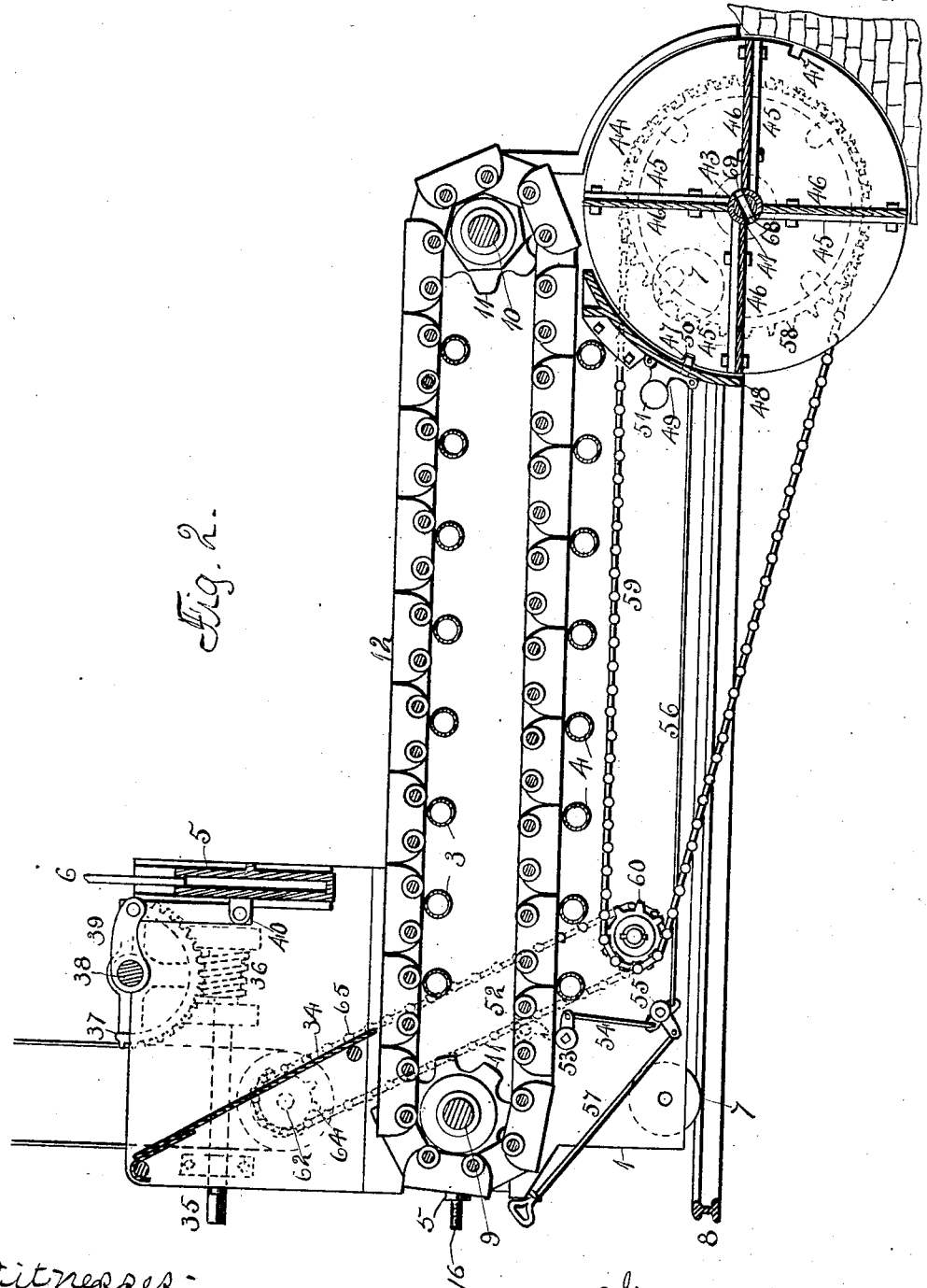

In the accompanying drawings, Figure 1 is a side elevation. Fig. 2 is a lengthwise vertical section. Fig. 3 is an end elevation in which parts are shown in section.

The main frame of my improved chain grate comprises two side sections 1 and 2, connected by two rows of cross bars or tubes 3 and 4 and a water-front 5, which can be filled through the pipes 6. This frame is supported upon four wheels 7, one located at each corner, and the wheels run upon tracks 8 in order that the frame and its attachments may be withdrawn from the fire-chamber for the purpose of making repairs. Two shafts 9 and 10 are supported by the side sections of the main frame, and these shafts support sprocket-wheels 11, over which pass the links of the chain grate 12. The upper section of the chain grate rests upon the upper row of cross-tubes 3, and the lower section of the grate rests upon the lower row of cross-tubes 4. The shaft 9 is located in boxes 13 slidable in ways 14 in the side frames, and the boxes can be moved in the ways by the nuts 15 on the screw-threaded rods 16 in order that sufficient slack may be given the chain to allow the removal of a link and the chain again tightened for use. The shaft 9 supports a worm-wheel 17 outside of the main frame, which worm-wheel meshes with a worm 18, supported by a shaft 19, and the shaft is supported in bearings 20. This shaft has a ratchet-toothed wheel 21 connected with it.

A bell-crank lever 22 has a pivotal connection on the shaft 19, and to the end of one of its arms is connected a shield 23, which covers some of the teeth of the ratchet-wheel 21. The other arm of the bell-crank lever is in handle form and has a projection extending from one face fitted to enter the notches of the rack-bar 24, pivoted at one end to one of the side bars of the main frame.

Upon the shaft 19 is pivoted a bar 25, its free end having a dog 26 pivoted thereto, which is capable of engaging the teeth of the ratchet-wheel 21. To the dog is pivotally connected a rod 27, to the other end of which is connected a coiled spring 28, and a rod 29 has one end connected to the coiled spring 28 and its other end connected to a crank 30, connected to some motive power. The coiled spring is located within a yoke 31, and the rod 29 passes through the upper end of the yoke and the rod 27 through the lower end. A collar 32 has a set-screw connection with the rod 27 outside of the yoke, and the rod 29 has a collar 33 set-screwed to it at the upper end of the yoke. This arrangement is employed to impart an intermittent advancing movement to the chain grate. As the crank revolves a reciprocating movement will be imparted to the rod 29, and on its downward movement the collar 33 will engage the yoke, and the yoke will engage the collar 32, thereby carrying the dog down. The upward movement of the rod 29 will pull upon the coiled spring 28, and through it upon the rod 27 and dog 26. This upward movement of the dog will cause it to engage the teeth of the ratchet-wheel 21 and advance it a number of teeth, which in turn will partially rotate the worm 18, and it in turn will rotate the worm-wheel 17, which will advance the grate a given distance. As the upward movement of the dog is the same each stroke, if the shield were not employed the ratchet-wheel would be given the same movement each time; but by means of the shield some of the teeth of the ratchet-wheel can be covered, and as the dog must clear the shield before it can engage the teeth of the ratchet-wheel it will be seen that a different rate of movement will be given the ratchet-wheel with each adjustment of the shield, and consequently the advancing movement of the grate can be regulated at will. The object of the employment of the coiled spring is to prevent breakage of the parts should the grate become clogged. This is accomplished by the upward movement of the crank exerting its influence upon the dog through the coiled spring, and at such time the yoke is useless. A crank can be placed on the squared end of the shaft and the grate advanced by hand.

An incline 34 is located over the feed end of the grate, forming one side of a hopper for the reception of fuel.

A short shaft 35 is supported in bearings and supports a worm 36, which meshes with a worm-wheel 37, supported by a shaft 38, located transversely of the frame. This shaft 38 has a series of arms 39 secured to it intermediate its bearings, and to each arm is suspended a link 40, their lower ends pivotally connected to the water-front 5. By means of a crank placed on the squared end of the shaft 35 the shaft 38 can be oscillated, which will raise or lower the water-front, thereby regulating the supply of fuel to the grate.

A shaft 41 is supported in bearings 42, set in masonry, forming the side walls of the fire-chamber and located near the discharge end of the grate, and around this shaft is located a tube or shell 43, having two heads 44 connected thereto, and from the inner face of each head extends radial ribs 45.

Plates 46 connect the ribs on one head with the ribs of the other head forming four sections or compartments. The periphery of one of the heads is provided with two notches 47.

The masonry forming the wall of the fire-chamber conforms to the curvature of the heads and, as shown at Figs. 1 and 2, covers the lower right-hand compartment. A curved plate 48 covers nearly the upper left-hand compartment, which in connection with the masonry leaves the upper right-hand compartment within the fire-chamber and the lower left-hand compartment within the ash-pit. A latch 49 has a pivotal connection with the curved plate 48, and a projection 50 from the latch passes through an opening in the plate and enters one of the notches 47 in the drum. A weight 51 holds the projection within the notch. In this instance I have shown a projection 52 extending from only one section of the grate-bars; but any number of grate-bars may be provided with them.

A bell-crank lever 53 has a pivotal support and one arm extending within the path of the movement of the projection extending from the grate-bars. A rod 54 connects the other arm of the bell-crank lever 53 with one arm of a bell-crank lever 55, and the other arm of the last-mentioned bell-crank lever has a connection with the pivoted latch 49 by the rod 56. As the projection 52, carried by the grate-bars, moves the bell-crank lever 53 the latch 49 will be moved sufficiently to withdraw the projection 50 from the notch 47 of the drum, thereby liberating it for a purpose to appear hereinafter. A rod 57 has a connection with the bell-crank lever 55, by means of which the projection can be withdrawn at any time by hand.

A sprocket-wheel 58 has a connection with one of the heads 44 of the drum, and a chain belt 59 connects this sprocket-wheel with another sprocket-wheel 60, connected to a short shaft, which also supports another sprocket-wheel 61.

A shaft 62 is supported in a bearing 63, and this shaft supports a sprocket-wheel 64, having a connection with the sprocket-wheel 61 by a chain belt 65.

A pulley 66 is loosely mounted on a sleeve extending from the sprocket-wheel 64, which in turn is loosely mounted on the shaft 62. The projecting end of this sleeve is externally screw-threaded, and a hand-wheel 67 has a screw-threaded connection with the sleeve. By means of the hand-wheel in its connection with the sleeve and bearing against the hub of the pulley the pulley can be clamped frictionally in connection with the sleeve, and consequently with the sprocket-wheel 64. As the pulley 66 is constantly rotating, its frictional engagement with the shaft 62 tends to rotate the shaft 62, and through the chain belts and sprocket-wheels the tendency is to rotate the drum, which is held from rotation by the projection 50 entering the notch 47 of the drum. When the projection is withdrawn from engagement with the drum, the drum will be rotated a half-revolution or until the projection 50 enters another notch, when the pulley will again slip on the shaft. The object of intermittently rotating the drum is to transfer the ashes from the fire-chamber into the ash-pit and without admitting cold air from the ash-pit into the fire-chamber. As the coal is burned the ashes will fall off the end of the grate into the upper right-hand compartment of the drum and will remain there until the drum is released, when a half-revolution will discharge the ashes into the ash-pit. It will be noticed that in the half-revolution of the drum necessary to discharge the ashes the masonry wall and the curved plate 48 leave an opening into the ash-pit of less than a quarter of the circumference of the drum. Consequently no direct draft can gain access from the ash-pit into the fire-chamber at any time around the discharge end of the grate. If it should happen that all the coal was not consumed, I have made provision for the admission of air from the ash-pit through the ashes contained in the compartment of the drum. This I accomplish by making a series of holes 68 transversely through the shaft 41 and holes 69 through the shell 43 diagonally—that is, from the lower left-hand compartment to the upper right-hand compartment or from the ash-pit into the fire-chamber. By turning the shaft 41 by hand its openings may be brought into register with the openings through the shell, thereby admitting air into the fire-chamber. By turning the shaft the openings therein may be so turned as to prevent air passing through the openings.

I claim as my invention—

1. The combination of a movable endless grate, a rotatable drum formed with receptacles, walls inclosing the drum on two opposite sides leaving a section of the drum communicating with the fire-chamber and another section communicating with the ash-pit, and adjustable passage-ways through the drum forming a communication between the ash-pit and fire-chamber.

2. The combination of a movable endless grate, a rotatable drum formed with receptacles and located at the discharge end of the grate, a latch holding the drum at rest, connections between the latch and grate for releasing the latch, and frictional devices for rotating the drum.

3. The combination of a movable endless grate, a rotatable drum formed with receptacles and located at the discharge end of the grate, a latch holding the drum at rest, connections between the latch and grate for releasing the latch, a hand-lever for releasing the latch and means for rotating the drum.

4. The combination of a movable endless grate, a movable surface receiving ashes from the grate, means for moving the surface, a latch for holding the surface at rest and connections between the latch and grate for releasing the latch.

JOSEPH P. BARNES

Witnesses:
AUBREY T. BARNES.
A. O. BEHEL.